April 17, 1945.  H. N. ATWOOD  2,373,738
SHEET MATERIAL
Filed Nov. 1, 1941
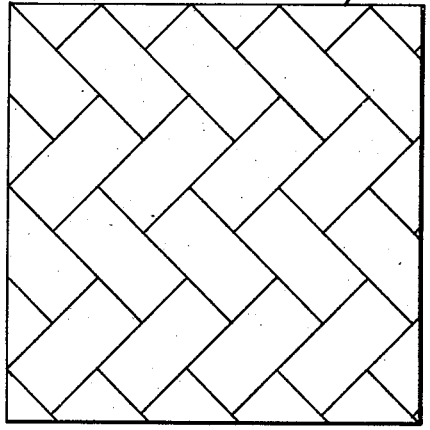
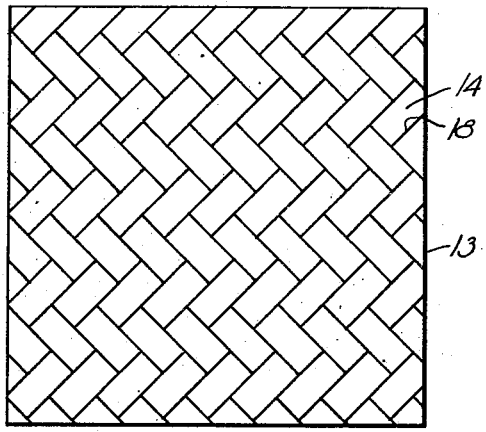
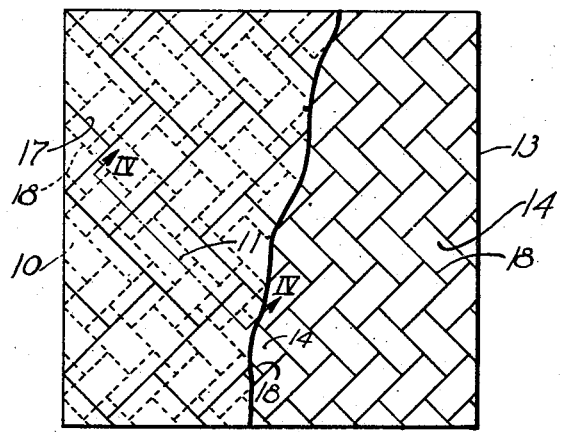
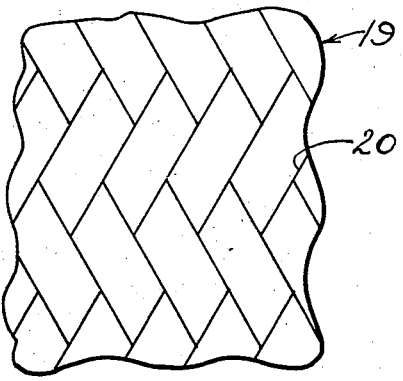
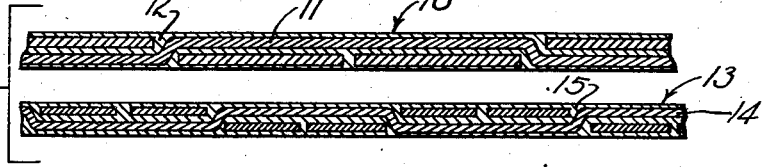
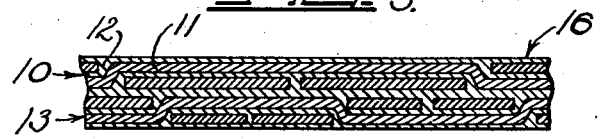
Inventor
HARRY N. ATWOOD Patented Apr. 17, 1945

2,373,738

UNITED STATES PATENT OFFICE 2,373,738

SHEET MATERIAL

Harry N. Atwood, Mellen, Wis.

Application November 1, 1941, Serial No. 417,457

2 Claims. (Cl. 154—45.9)

This invention relates to sheet material and more particularly to laminated sheet material formed of interwoven or interlocked strips or ribbons and bonded together by means of a plastic.

In my Patent No. 2,126,711, dated August 16, 1938, I have disclosed and claimed sheet material of the general type of construction as that which is formed into a laminated sheet material in accordance with the present invention. Instead of merely laminating two sheets of light interwoven material, however, I form the sheets to be laminated of different widths of ribbon or strip material, or with the ribbon or strip material in the adjacent laminations at different angles to each other, so that the lateral edges of the ribbon or strip material are for the most part non-coincidental. I have found that by so doing the strength of the laminated material is greatly increased, as is also its resistance toward cracking.

It is therefore an important object of this invention to provide sheet material composed of laminations of interwoven or interlocked strip material, wherein the strips in adjacent laminations are either of dissimilar width or arranged at different angles with respect to one another so that the lateral edges of the strips in adjacent laminations will be non-coincidental, or out of registration with one another.

Other and further important objects of this invention will be apparent from the disclosures in the specification and the accompanying drawing.

This invention (in a preferred form) is illustrated in the drawing and hereinafter more fully described.

On the drawing:

Figure 1 is a plan view of woven sheet material of a single thickness such as may be used in making the laminated sheet material of the present invention.

Figure 2 is a plan view of similar woven sheet material but with the ribbons or strips thereof relatively narrower than the ribbons or strips of the sheet material of Fig. 1.

Figure 3 is a plan view of the finished, laminated sheet material of my invention, with the upper laminations broken away to show the lower laminations.

Figure 4 is an enlarged fragmentary sectional view of the sheet material of Figs. 1 and 2 before being laminated together.

Figure 5 is an enlarged fragmentary sectional view of the finished laminated sheet material of Fig. 3.

Figure 6 is a fragmentary plan view of woven sheet material of single thickness showing the ribbons or strips at a different angle from that of the ribbons or strips in Figs. 1 and 2.

As shown on the drawing:

The reference numeral 10 indicates generally a sheet formed of interwoven strips 11 of wood veneer, or other suitable form-retaining material. In accordance with the invention disclosed in my Patent No. 2,126,711, above referred to, the strips 11 are coated with a plastic material before being interwoven into the sheet 10 and, after being woven into the form of sheets, which may be more or less continuous in character, the woven material is subjected to a pressing operation to cause an interlocking of the ribbons or strips 11 without, however, breaking or rupturing the fibers of the veneer or other fibrous material constituting the strips or ribbons. During this pressing operation, the plastic material flows around and between the strips or ribbons 11 to wholly encase said strips or ribbons, while at the same time separating the individual strips or ribbons from each other, the plastic material being indicated by the reference numeral 12 (Figs. 4 and 5).

A second sheet of material, indicated by the reference numeral 13 (Fig. 2) is made up in a similar way to the sheet 10 except that the strips or ribbons 14 of said sheet 13 are relatively narrower than the strips or ribbons 11 of the sheet 10. The individual strips or ribbons 14 are likewise encased within and coated with a plastic 15, which is preferably the same type of plastic as the plastic 12 of the sheet 10. The sheets 10 and 13 are next superimposed and subjected to sufficient heat and pressure to cause the adjacent faces of the plastic material 12 and 15 to fuse together and bond the two sheets as laminations into an integral laminated sheet, indicated by the reference numeral 16 (Fig. 5).

As best shown in Fig. 3, the lateral edges 17 of the strips or ribbons 11 in the laminations formed by the original sheet 10 do not coincide or register with the lateral edges 18 of the strips or ribbons 14 of the laminations formed by the original sheet 13. Because of the difference in the width of the strips or ribbons 11 and 14, their respective lateral edges 17 and 18 can be offset from one another in superimposing the sheets 10 and 13 to form the laminations of the final laminated sheet material 16. This arrangement materially increases the strength of the finished laminated sheet material over that which might be obtained if the strips or ribbons of the adjacent laminations were of the same width and their lateral edges were coincidental.

A somewhat similar result is obtained by arranging the strips of adjacent laminations at different angles. As illustrated in Fig. 6, a sheet 19 may be made up of interwoven strips 20 arranged in a different angular relationship than that of either the strips or ribbons 11 of the sheet 10 or the strips or ribbons 14 of the sheet 13. Thus, when a sheet such as 19 is laminated to a sheet such as 10 or 13, the lateral edges of the strips or ribbons in adjacent laminations are for the most part non-coincidental. Where the strips or ribbons forming the sheet material are cut from wood veneer, the grain of the wood is generally longitudinally of the strips, so that with the strips arranged at different angles in adjacent laminations, the grains in the wood veneers of the adjacent laminations would also be at an angle, thereby increasing the strength of the finished laminated sheet material.

While the material 12 and 15 has been referred to generally as plastic material, it will be understood that either a thermoplastic or a thermosetting plastic material may be used. While I have found that thermoplastic materials are preferable, especially in the manufacture of aircraft skins because of the greater ease of construction and repair, thermosetting resins may nevertheless be entirely suited where the laminated sheet material is to be used for other purposes. Among the thermoplastic materials that have been found satisfactory may be mentioned the cellulosic derivatives, such as cellulose acetate, cellulose ethers and the like, poly vinyls, poly styrenes and many others. Thermosetting resins, such as phenol-formaldehyde type of resins, the urea-formaldehyde type of resins, and numerous others are available for use where the characteristics of such thermosetting resins are such as to adapt the finished laminated material to the uses and purposes for which it is intended.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. Self-sustaining sheet material comprising a plurality of laminations of interlocked, form retaining strips encased in a plastic, the strips in adjacent laminations being of different width with lateral edges thereof disposed in generally non-coincidental relationship.

2. Self-sustaining sheet material comprising a plurality of laminations of interlocked wood veneer strips encased in a thermoplastic, the strips in adjacent laminations being of different width with lateral edges thereof disposed in generally non-coincidental relationship.

HARRY N. ATWOOD.